No. 883,924. PATENTED APR. 7, 1908.
W. S. WEEDON.
ARC LAMP ELECTRODE.
APPLICATION FILED APR. 21, 1903.

Witnesses:

Inventor:
William S. Weedon.
by
Att'y.

UNITED STATES PATENT OFFICE.

WILLIAM S. WEEDON, OF SCHENECTADY, NEW YORK, ASSIGNOR TO GENERAL ELECTRIC COMPANY, A CORPORATION OF NEW YORK.

ARC-LAMP ELECTRODE.

No. 883,924.　　　Specification of Letters Patent.　　　Patented April 7, 1908.

Application filed April 21, 1903. Serial No. 153,621.

*To all whom it may concern:*

Be it known that I, WILLIAM S. WEEDON, a citizen of the United States, residing at Schenectady, county of Schenectady, State of New York, have invented certain new and useful Improvements in Arc-Lamp Electrodes, of which the following is a specification.

An electrode composed principally or entirely of titanium carbid for use in an arc lamp has been found to possess extraordinary light-giving qualities. After such electrodes have been used, it is found, however, that in that portion of the electrode which is heated to an oxidizing temperature by the arc, a considerable portion of the carbid is converted into titanium oxid without vaporization. The extreme end of the electrode is more or less compact, but back some distance from the end the electrode is not homogeneous and compact, but is full of fissures and possesses little mechanical strength. As the oxidation continues, a considerable portion of the tip end of the electrode, containing titanium both in the form of the oxid and the carbid not yet converted into oxid, loses its cohesiveness so that the tip breaks away and is lost. This is of course objectionable, as it materially increases the consumption of the electrode and interferes with the proper operation of the electrode. I have found that this injurious oxidation of the electrode can be prevented by incasing the titanium carbid in a suitable sheath or casing. The sheath or casing should be made of some material which is not readily affected by the heat produced in operation or other conditions of use, or which under those conditions forms compounds which protect the carbid from the air. The material which I ordinarily employ for the sheath is copper, and I prefer to apply the copper to the titanium carbid by electro-deposition, as I can thereby obtain a very thin layer of copper intimately connected to the titanium carbid.

Figure 1:
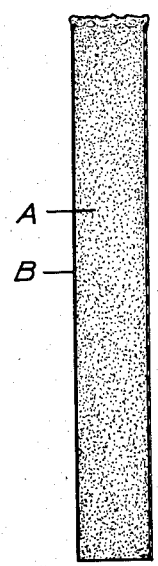
Figure 2:
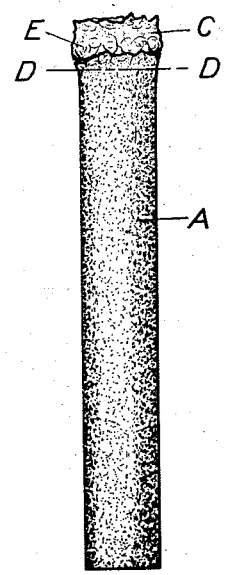

For a better understanding of my invention, reference may be had to the accompanying drawings, Figure 1 of which illustrates a sectional elevation of an electrode made in accordance with my invention, and Fig. 2 illustrates an electrode composed of titanium carbid which has been used without a protecting sheath or casing to prevent oxidation.

Referring to the drawings, A represents a core or pencil formed wholly or partially of titanium carbid, and B represents a thin, protecting sheath or casing of copper which is preferably electro-plated on the carbid core.

The arc end of the titanium carbid electrode without a protecting casing is indicated at C in Fig. 2. When so used, progressive oxidation of the electrode takes place from the surface of the electrode inward between the upper end of the electrodes and the line D. The distance between the arc end of the electrode and this line D, which marks the limit of the portion of the electrodes heated to an oxidizing temperature by the current, is determined by the dimensions and construction of the electrode and the conditions of use. The portion above the line D swells up as oxidation takes place and disintegrates, fissures being formed as indicated at E. The weakening of the electrode is most noticeable closely adjacent to the line D. At the arc surface the material composing the electrode becomes metallic in appearance and very hard, but this effect does not extend back very far. Eventually substantially all that portion of the electrode above the line D separates from the main portion of the electrode and drops off. In the further use of the electrode a similar oxidation and breaking away of a considerable portion of the electrode takes place at intervals. This produces a serious waste of the electrode and interferes with the steadiness of the light produced and is otherwise objectionable.

When the electrode is incased in copper, however, as in Fig. 1, none of these results occur. The copper and copper oxid or oxids, into which more or less of the copper adjacent the arc end of the electrode is converted, vaporize only near the arc, and until vaporized act to protect the core so that the only consumption of the titanium carbid which takes place is at the surface from which the arcing takes place.

What I claim as new, and desire to secure by Letters Patent of the United States, is,—

1. An electrode consisting of titanium carbid incased in a copper sheath.

2. An arc electrode consisting of a core or pencil formed of a material which crumbles when heated in air, and a casing therefor, which only vaporizes near the arc and thus protects the heated portion of the core or pencil back of the arc from access of air.

3. An electrode consisting of a core or pencil containing titanium carbid and electroplated to prevent crumbling when heated.

4. An electrode consisting of a core or pencil containing titanium carbid and a casing therefor formed of some material which will prevent injurious oxidation of the titanium carbid when heated.

5. An electrode consisting of a core or pencil containing titanium carbid, and a casing or sheath therefor formed of some material the oxids of which are stable at comparatively high temperature.

6. An electrode consisting of a core or pencil formed of a carbid and a casing or sheath therefor of copper.

7. An arc electrode made of such material that the tip together with a portion back of the arc tends to separate from the body of the electrode when highly heated in air, and means for preventing such separation comprising a copper casing or sheath.

8. An electrode comprising a core formed of a metallic carbid which is stable in the presence of atmospheric moisture, and a protective coating therefor.

In witness whereof I have hereunto set my hand this 18th day of April 1903.

WILLIAM S. WEEDON.

Witnesses:
EDWARD WILLIAMS, Jr.,
MARCUS L. BYNG.